(12) United States Patent
Risbud et al.

(10) Patent No.: US 12,724,656 B2
(45) Date of Patent: Sep. 1, 2026

(54) THERMAL AWARE PREDICTIVE FAILURE ANALYSIS

(71) Applicant: Intel Corporation, Santa Clara, CA (US)

(72) Inventors: Vinayak Risbud, Bangalore (IN); Karthik D M, Davangere (IN); Amarnath C, Kolar (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/078,777

(22) Filed: Dec. 9, 2022

(65) Prior Publication Data

US 2023/0105565 A1 Apr. 6, 2023

(51) Int. Cl.
*G06F 11/07* (2006.01)
*G06F 1/20* (2006.01)

(52) U.S. Cl.
CPC ............ *G06F 11/076* (2013.01); *G06F 1/206* (2013.01); *G06F 11/073* (2013.01)

(58) Field of Classification Search
None
See application file for complete search history.

(56) References Cited

U.S. PATENT DOCUMENTS 4,722,669 A * 2/1988 Kundert .................. F04D 27/00 318/473
2007/0191993 A1* 8/2007 Wyatt ...................... G11C 5/00 257/E23.08
2008/0141077 A1* 6/2008 Swanson .............. G06F 11/008 714/48

* cited by examiner

*Primary Examiner* — Guerrier Merant
(74) *Attorney, Agent, or Firm* — Compass IP Law PC

(57) ABSTRACT

Predictive Failure Analysis (PFA) techniques that are thermal aware can enable the prevention of uncorrectable errors without premature replacement of memory resources with redundant memory resources. In one example, a management controller (such as Baseboard Management Controller (BMC)) can monitor the rate of corrected errors. When the BMC detects that there are too many corrected errors occurring within certain time duration, the BMC can check the temperature and airflow rate of memory modules. Based on temperature data, the BMC can boost the fans and verify the reduction in memory corrected errors. If after multiple retries the rate of corrected error remains same, the BMC can enable memory resource replacement techniques such as SDDC or ADDDC or sparing on the failing memory module.

20 Claims, 8 Drawing Sheets

THERMAL AWARE PREDICTIVE FAILURE ANALYSIS

FIELD

Descriptions are generally related to techniques for preventing or mitigating uncorrectable errors in memory.

BACKGROUND

Computer systems include one or more types of memory to store both user data and instructions for execution by a processor. Memory can be susceptible to errors due to a variety of reasons. Some errors are correctable via error code correction (ECC) techniques. Other errors are uncorrectable by the system. Uncorrectable errors can result in system failure.

Predictive Failure Analysis (PFA) refers to techniques for predicting when memory will encounter an uncorrectable error based on a high count of corrected errors. Thus, when a high count of corrected errors is encountered, memory reliability enhancement technologies such as single device data correction (SDDC), adaptive double device data correction (ADDDC) or sparing can be enabled to evict the memory device or rank with the high corrected error rate to prevent the system from experiencing an uncorrectable error.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" or examples are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

Thermal aware predictive failure analysis techniques are described herein.

According to existing Predictive Failure Analysis (PFA) techniques, whenever there are too many corrected errors, there is high probability that the platform memory will hit an uncorrectable error. However, current PFA techniques are based solely on corrected error count. For example, when the corrected error count exceeds a threshold, single device data correction (SDDC), adaptive double device data correction (ADDDC), or rank sparing is triggered. One of the reasons for a burst of corrected errors or an uncorrectable error in a memory module is the temperature of the memory module. Existing techniques fail to consider parameters other than corrected error count, such as air flow rate and temperature of memory module for predicting memory module failures. As a result, existing PFA techniques activate SDDC, ADDDC, or sparing earlier than required.

In contrast, examples of predictive failure analysis techniques described herein consider the thermal status of the memory module in addition to corrected error rate. One of the reasons for memory module failure is the temperature variations experienced by the memory modules. A memory module operating at higher temperatures will typically experience more correctable errors. In one example, a system includes out-of-band RAS capabilities in which a management controller (such as a Base Board Management Controller (BMC)) counts the number of corrected errors that occurred on a particular memory module. In one such example, when the BMC detects that the corrected error threshold is exceeded, the BMC enables SDDC, ADDDC, or sparing. In one example, the BMC also has access to sensors (e.g., thermal sensors and airflow sensors) and can control the fan speed. In one example, when the BMC detects that there are too many corrected errors happening within a certain duration (but fewer errors than the threshold to trigger SDDC, ADDDC, or sparing), the BMC can check the temperature and airflow rate of the memory modules and boost the fans to the region including the memory modules based on the temperature data. In one example, the BMC verifies the reduction in corrected memory errors before reducing the fan speed in the region with the memory modules. If the rate of corrected error remains same or increases after boosting the fan speed, the BMC can then enable SDDC, ADDDC, or sparing on the failing memory module.

Figure 1A:
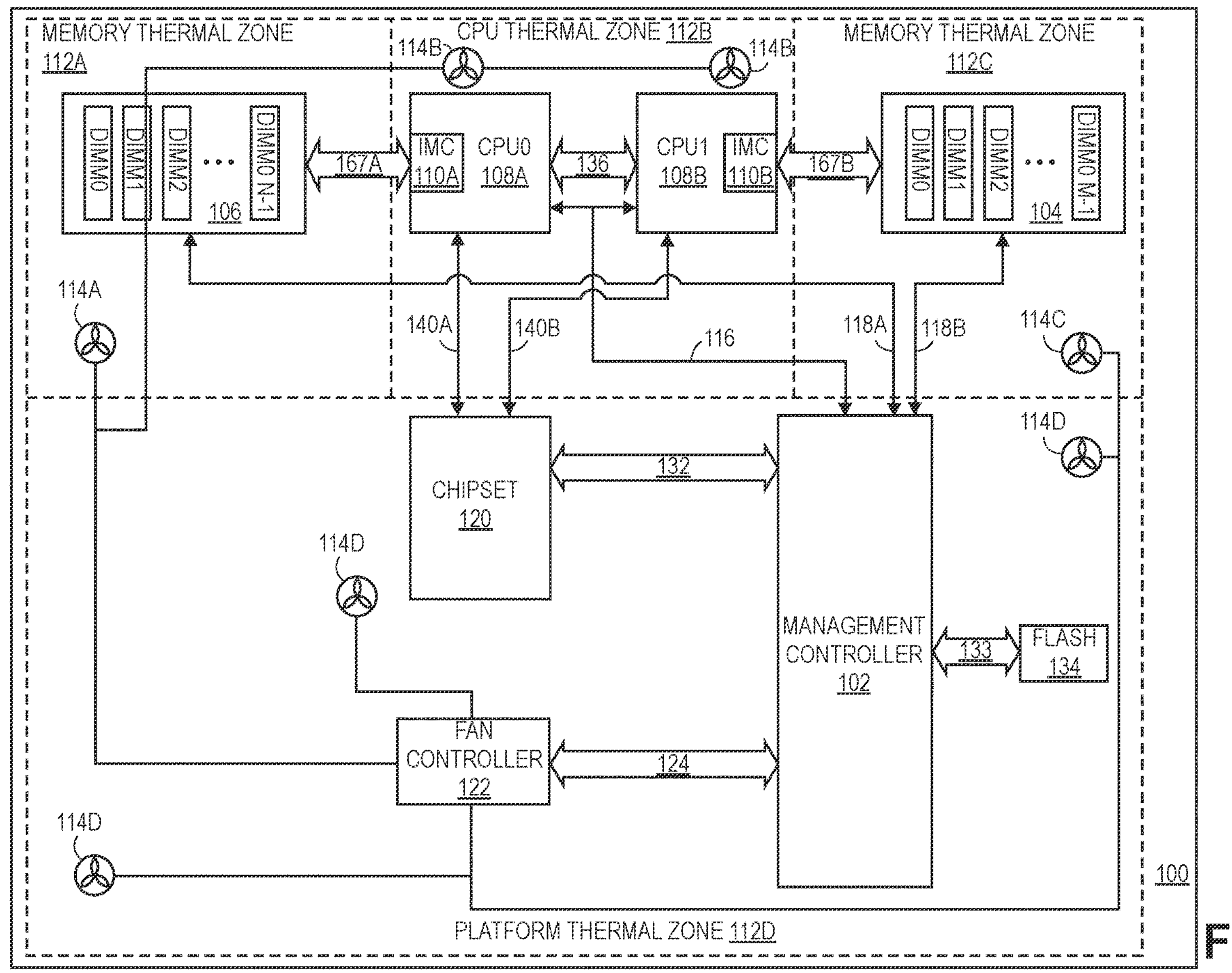
FIG. 1A is a block diagram of an example of a system in which thermal aware predictive failure analysis techniques can be implemented.
Figure 1C:
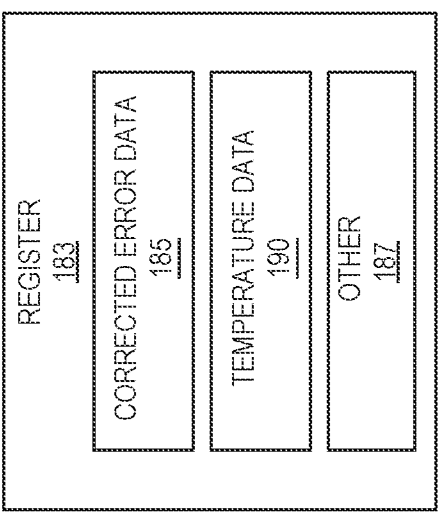
FIG. 1C is a block diagram of an example of a register of a memory controller.
Figure 1B:
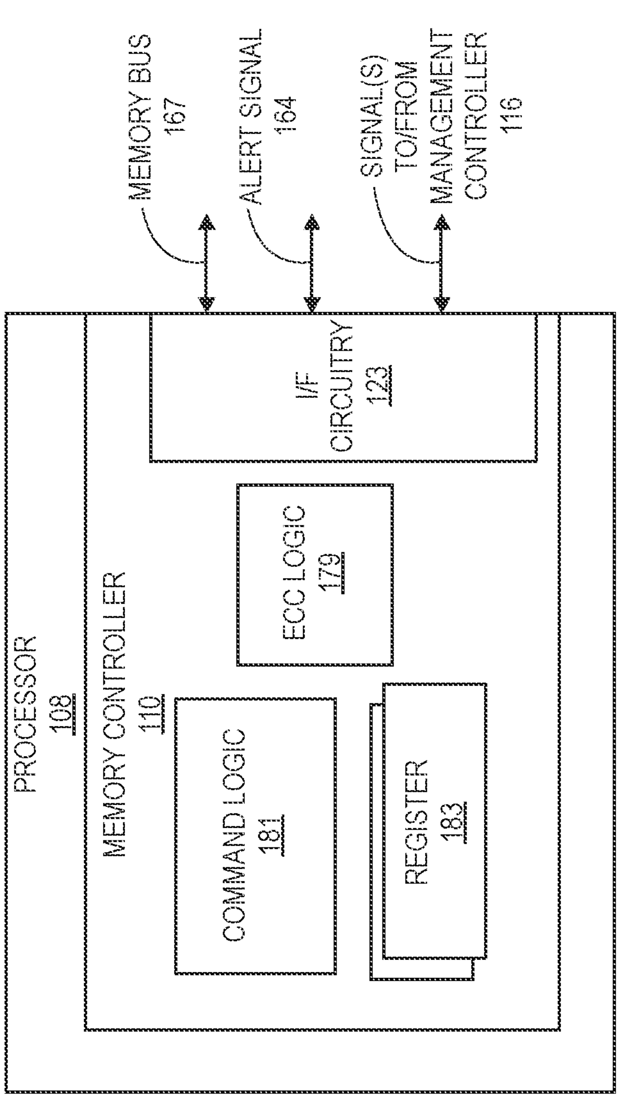
FIG. 1B is a block diagram of an example of a memory controller.
Figure 1D:
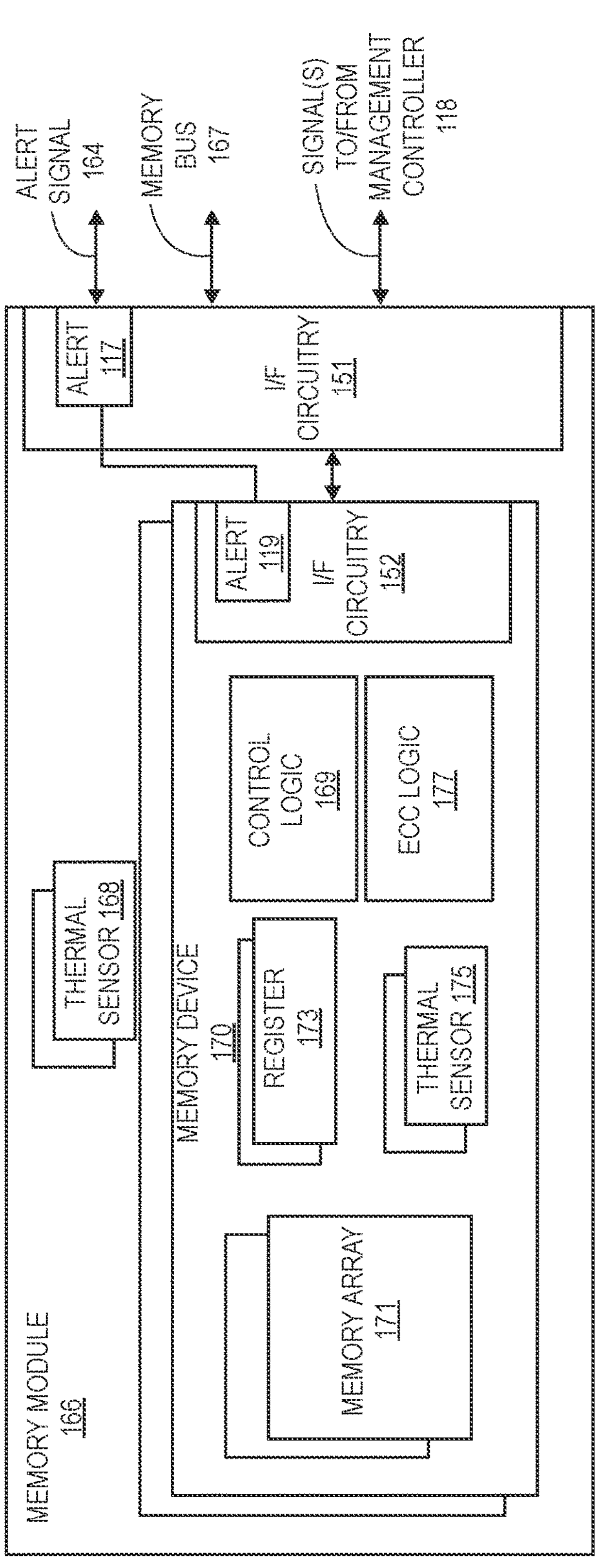
FIG. 1D is a block diagram of an example of a memory module.
Figure 1E:
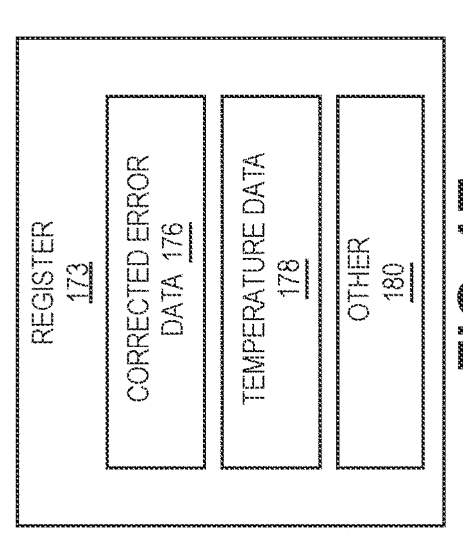
FIG. 1E is a block diagram of an example of a register of a memory device.
Figure 1F:
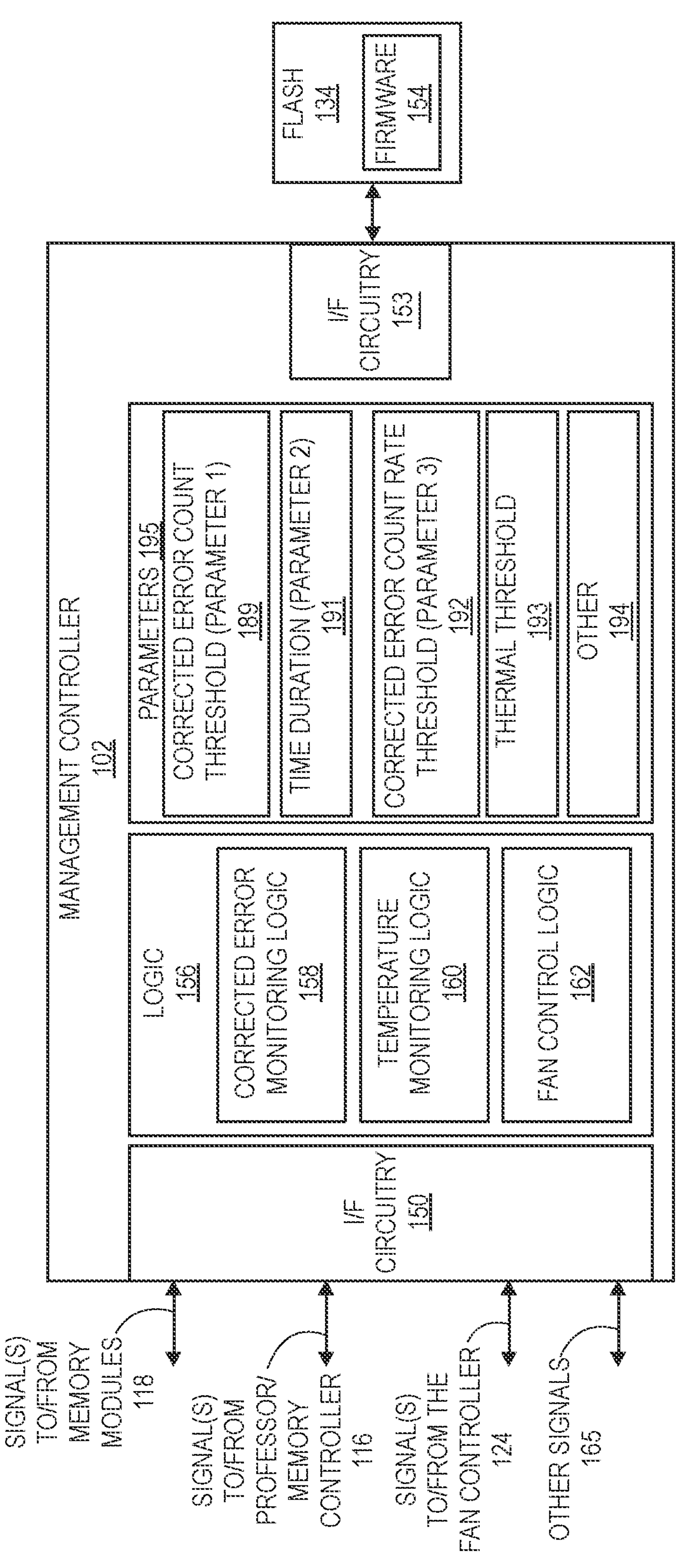
FIG. 1F is a block diagram of an example of a management controller.

FIG. 1A is a block diagram of an example of a system 100 in which thermal aware predictive failure analysis techniques can be implemented. FIGS. 1B-1F are block diagrams of examples of elements of the system 100 of FIG. 1A. For example, FIG. 1B is a block diagram of a memory controller. FIG. 1D is a block diagram of a memory module. FIGS. 1C and 1E are block diagrams of registers of a memory controller and memory device, respectively. FIG. 1F is a block diagram of a management controller.

Referring first to FIG. 1A, the system 100 is a multiprocessor system that includes a plurality of processors or cores including a first processor 108A and a second processor 108B coupled via an interface 136 such as a point-to-point (P-P) interconnect, a fabric, and/or bus. In some examples, the first processor 108A and the second processor 108B are homogeneous. In some examples, first processor 108A and the second processor 108B are heterogenous. Though the example system 100 is shown to have two processors, the system 100 may have three or more processors, or may be a single processor system. In some examples, the computing system is a system on a chip (SoC).

Processors 108A and 108B are shown including integrated memory controller (IMC) circuitry 110A and 110B, respectively. The IMCs 110A, 110B couple the processors 108A, 108B to respective memories, namely a memory 106 and a memory 104, which may be portions of main memory locally attached to the respective processors. In the illustrated example, the memory controllers 110A, 110B are coupled to the memory 104A, 104B via memory buses 167A, 167B, respectively. FIG. 1B is a block diagram of an example of a memory controller 110. The memory controller 110 is an example of the memory controllers 110A, 110B of FIG. 1A. The memory controller 110 represents one or more memory controller circuits or devices for the system 100. In one example, the memory controller 110 includes logic implemented on the same die or implemented in the same package space as the processor 108.

The memory controller 110 includes command logic 181 that generates memory access commands in response to the execution of operations by a processor, such as the processors 108A, 108B. The memory controller 110 accesses one or more memory devices, such as the memory device 170 of FIG. 1D. In one example, the memory devices 170 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel.

The memory controller 110 includes I/O interface circuitry 123 to couple to a memory bus 167, such as a memory channel as referred to above. The I/O interface circuitry 123 (as well as I/O interface circuitry 151 of the memory module 166 and the I/O interface circuitry 152 of memory device 170) can include pins, pads, connectors, signal lines, traces, or wires, or other hardware to connect the devices, or a combination of these. The I/O interface circuitry 123 can include a hardware interface. The I/O interface circuitry 123 includes at least drivers/transceivers for signal lines. Commonly, wires within an integrated circuit interface couple with a pad, pin, or connector to interface signal lines or traces or other wires between devices. The I/O interface circuitry 123 can include drivers, receivers, transceivers, or termination, or other circuitry or combinations of circuitry to exchange signals on the signal lines between the devices. The exchange of signals includes at least one of transmit or receive. Note that although the I/O interface circuitry 123, 151, and 152 are each illustrated as a single block, the I/O interface circuitry can represent multiple hardware interfaces for coupling with various signal lines, buses, links, and/or fabrics.

The memory bus 167 between memory controller 110 and memory devices 170 can be implemented as multiple signal lines coupling the memory controller 110 to the memory devices 170 on the memory module 166. In one example, a bus or connection between memory controller 110 and memory can be referred to as a memory bus. In one example, the memory bus is a multi-drop bus. The bus may typically include at least a clock (CLK) signal, command/address (CMD) signals, and data signals (DQ). In the illustrated example, an Alert signal line 164 couples an Alert pin 117 of the memory module 166 with the memory controller 110. The Alert pin 117 of the memory module is coupled with an alert pin 119 of each memory device 170 on the memory module 166 (e.g., in a daisy chain configuration). In one example, the Alert pins 117, 119 can be used to signal the occurrence of an error or other event. It will be understood that in addition to the lines explicitly shown or mentioned, a bus can include at least one of strobe signaling lines, alert lines, auxiliary lines, or other signal lines, or a combination.

The I/O interface circuitry 123 of the memory controller 110 also includes an interface to couple the memory controller 110 with the management controller 102 via one or more signal lines 116. In one example, the memory controller 110 and/or a processor that includes the memory controller 110 communicate with the management controller 102 via one or more signal lines 116. In one example, the signal lines 116 directly couple with one or more GPIO pins of the processors 108A, 108B and/or the memory controllers 110A, 110B. In one example, the management controller 102 also has a communication path with the processors 108A and 108B (or the memory controllers 110A, 110B) via other interface circuitry, such as the chipset 120 of FIG. 1A. In one example, the chipset 120 is a peripheral control hub (PCH). In one such example, the management controller 102 couples with the chipset 120 via one or more buses, links, or fabrics 132, such as an Management Component Transport Protocol (MCTP) interface, a PCIe link, a Universal Serial Bus (USB) (such as USB 2.0), an I2C bus, an I3C bus, a serial peripheral interface (SPI), an embedded SPI (eSPI), GPIO pins and signal lines, SMBus, PECi, or other bus, link, or fabric). Thus, in one example, the processors 108A, 108B can each exchange information with a chipset 120 via individual interfaces, lines, buses, or fabrics 140A, 140B. In other examples, the functionality of the chipset 120 (such as interfaces and/or data path control) can be integrated into the processors 108A, 108B and/or another component of the system 100.

Referring again to FIG. 1B, the memory controller 110 includes registers 183. The registers 183 represent one or more storage devices or storage locations that provide configuration or settings for the operation of the memory devices 170 or the memory controller 110. FIG. 1C is a block diagram of an example of register 183 of the memory controller 110. The registers 185, 190, and 187 include different registers and/or different fields or addressable ranges of the same register(s). In one example, one or more registers store a value or values indicative of a temperature of a memory module and/or memory devices. For example, the register 190 stores one or more values indicative of a temperature of the memory module 166 and/or memory device 170 of FIG. 1D. In one example, the register 190 stores one or more values based on a temperature detected by one or more on-die thermal sensors of one or more memory devices (e.g., from the on-die thermal sensor 175) or one or more memory module thermal sensors (e.g., the thermal sensor 168 on the memory module 166).

In the illustrated example, the register 183 includes a corrected error count register 185 to store one or more values indicative of the corrected error count detected in a memory module or memory device. In one example, the register 185 stores a value indicative of the number of errors in a particular memory rank, device on a memory module, and/or memory module. In one example, the register 185 indicates a location of corrected errors (e.g., at a memory module, memory device, rank, or other granularity) and a count at that location. The memory controller 110 typically also includes other registers 187 to store configuration or mode information.

Referring again to FIG. 1B, the memory controller 110 includes ECC logic 179, which represents error checking and correction logic at the host or memory controller side. The ECC logic 179 performs error checking and correction for data received from multiple memory devices 170. In one example, the ECC logic 179 includes circuitry to execute ECC operations on data received from memory devices 170. In one example, the ECC logic 179 generates ECC check bits to send with write data for a write command. In one example, the ECC logic 179 can also correct errors in read data received from memory devices 179.

Referring again to FIG. 1A, in one example, the memory 106, 104 of the system 100 includes one or more memory modules. For example, the memory 106 includes N dual inline memory modules (DIMMs) (e.g., DIMM 0-DIMM N−1) and the memory 104 includes M DIMMs (e.g., DIMM 0-DIMM M−1), where N and M are positive integers, which can be the same or a different number. There are a variety of types DIMMs, including unbuffered or unregistered DIMMs (UDIMMs), registered DIMMs (RDIMMs), load reduced DIMMs (LRDIMMs), small-outline DIMMs (SO-DIMMs), and microDIMMs. The system may also, or alternatively, include memory modules other than DIMMs such as compression-attached memory modules (CAMMs), stacked memory modules, or other memory modules. In one such example, the memory modules of the memory 106, 104 are compatible with a memory standard such as a double data rate synchronous dynamic random-access memory (DDR) standard, such as those standards listed below with respect to the memory 430 of FIG. 4.

FIG. 1D is a block diagram of an example of a memory module 166. The memory module 166 includes I/O interface circuitry 151 to couple memory devices 170 of the memory module 166 to a memory bus 167 via I/O interface circuitry 152 of the memory devices 170. The I/O interface circuitry 151 of the memory module 166 also includes an interface to couple the memory module 166 with one or more signal lines 118 to/from the management controller 102. In one example, the memory module 106 is coupled with the management controller 102 via an I2C bus, or other bus, link, or fabric. In one example, the one or more signal line(s) 118 include an out-of-band link.

The memory module 166 includes one or a plurality of memory devices (e.g., memory chips or memory dies) 170. A memory device 170 includes one or more memory arrays 171 to store data. The memory array 171 represents an array of addressable memory locations. Typically, the memory array 171 is addressable at least by row (e.g., wordline) and column (e.g., bitline). The memory array 171 can be subdivided into various banks or sub-banks, or other divisions. The memory array 171 stores data and ECC data. The data stored in the memory array 171 can include data written from a memory controller (e.g., the memory controller 110 of FIG. 1B). The memory device 170 includes control logic 169 to control internal operations within the memory device 170. For example, the control logic 169 decodes commands sent by memory controller 110 and generates internal operations to execute or satisfy the commands.

The memory device 170 includes one or more registers 173. The registers 173 represent one or more storage devices or storage locations that provide configuration or settings for the operation of the memory device 170. FIG. 1E is a block diagram of an example of register 173 of the memory device 170. The registers 176, 178, and 180 include different registers and/or different fields or addressable ranges of the same register(s). In one example, one or more registers store a value or values indicative of a temperature of the memory device 170. For example, the register 178 stores one or more values indicative of a temperature of the memory device 170. In one example, the register 178 stores one or more values based on a temperature detected by one or more on-die thermal sensors of the memory device (e.g., from the on-die thermal sensor 175).

In the illustrated example, the register 173 includes a corrected error data register 176 to store one or more values indicative of the corrected error count detected in a memory device. In one example, the register 176 stores a value indicative of the number of errors in particular code words, rows, or other granularities. In one example, the register 176 indicates a location of corrected errors (e.g., location or address of the code word or row, or other granularity) and a count at that location. The memory device 170 typically also includes other registers 180 to store configuration or mode information.

The memory device 170 includes error correction code (ECC) 177, which represents on-die ECC or on device ECC. In one example, the ECC logic 177 operates within memory device 170 to correct data errors for data before the memory device 170 provides the data to the memory controller 110. The operation of the ECC logic 169 of memory device 170 will be understood to be different from the operation of the ECC logic 179 of memory controller 110. The memory controller 110 computes ECC and sends check bits that can be stored in one or more of the multiple memory devices. In one example, some of the memory devices will store only data, and others may store only ECC check bits. The ECC logic 177 operates within memory device 170 to check and correct errors within the memory device 170 prior to returning the portion of bits stored in the memory device 170.

In one example, when the ECC logic 177 encounters an error, the control logic 169 of the memory device 170 stores information about the error in one or more registers 173. In one such example, the memory device 170 tracks the location of error (e.g., code words, rows, or other granularities) and error count for a particular location. In one example, when the ECC logic 177 or other error detection logic of the memory device 170 detects a correctable error, the memory device drives a pin to a logic level to indicate that an error has occurred. For example, the memory device 170 can drive the Alert pin 119 to a logic 0 or logic 1, depending on implementation, to indicate that an error has occurred. In one such example, the Alert pin 119 from each memory device 170 of the memory module 166 are coupled together and coupled with a corresponding Alert pin 117 of the memory module 166. In one such example, the Alert pin 117 is coupled with a signal line 164 to the memory controller 110. In one such example, when the memory controller 110 detects that an error has occurred, the memory controller 110 can read one or more registers 185 to determine where the error occurred and/or determine an updated error count for a particular memory device 170, rank, memory module, and/or other granularity of memory resources. In another example, in addition to, or instead of, detecting a memory error via the Alert signal 164, the memory controller 110 can periodically read the register 173 to obtain updated data regarding the location and number of corrected memory errors.

Memory modules can include thermal sensors (which can also be referred to as temperature sensors) on the module, on the memory devices, or both on the module and on the memory device. For example, the memory device 170 includes a thermal sensor 175 and the memory module 166 includes a thermal sensor 168. A thermal sensor on a DIMM can be referred to as a module-level thermal sensor, an on-DIMM thermal sensor or a thermal sensor on-DIMM (TSOD). A thermal sensor on a memory device can be referred to as an on-die thermal sensor. In one example, temperature data detected by the on-die thermal sensor 175 can be stored in the register 190, which can be read by the memory controller 110. In one example, the thermal sensor 168 on the memory module 166 is directly accessible by the management controller 102. For example, the management controller 102 can read temperature data detected by the thermal sensor 168 via signal line(s) 118 and interface circuitry 151, 150.

Referring again to FIG. 1A, the system 100 includes multiple thermal zones 112A-112D. In one example, the thermal zones 112A-112D represent zones of the system 100 with independently controllable fans. For example, the memory thermal zone 112A includes a fan 114A to cool the region of the system 100 with the memory 106. The CPU thermal zone 112B includes fans 114B to cool the region of the system 100 with the processors 108A, 108B. The memory thermal zone 112C includes a fan 114C to cool a region of the system 100 with the memory 104. The platform thermal zone 112D includes fans 114D to cool a region of the system 100 with the chipset 120 and management controller 102. The thermal zones 112A-112D can each include one or multiple fans. Although four thermal zones are illustrated in FIG. 1A, other systems may include fewer than four zones (e.g., 1, 2, or 3) or more than four zones (e.g., 5, 6, 8, 20, etc.). In one example, the fans 114A-114D are controlled by a fan controller 122. The fan controller 122 includes logic to independently control the speed of the fans 114A-114D. Although the fan controller 122 is illustrated as a separate block, one or more aspects of the fan control logic can be included in another component of the system, such as the management controller 102.

The system 100 also includes a management controller 102. In one example, the management controller 102 is a baseboard management controller (BMC). In one example, the management controller 102 represents a coprocessor or controller of the system 100 to help with external or out-of-band management. Out-of-band management refers to management (e.g., monitoring, configuring, and/or updating) system resources independently of the status of in-band components such as the processors 108A, 108B or other in-band components of the system 100. In one example, the management controller 102 is external from the processors 108A, 108B (e.g., on a separate chip) and powered independently from in-band components of the system 100. Thus, unlike conventional in-band management that can only be performed when the processors 108A, 108B are powered up and operating (such as with a BIOS running on a processor), out-of-band management with the management controller 102 can be performed regardless of whether the processors 108A, 108B or other in-band components are powered up or operational. In one example, the management controller 102 performs one or more reliability availability and serviceability (RAS) functions. In one example, the management controller 102 includes logic to communicate information to and from components of the system 100 related to thermal thresholds, sensor information, or other platform statistics.

FIG. 1F is a block diagram of an example of a management controller 102. In the example illustrated in FIG. 1F, the management controller 102 includes I/O interface circuitry 153 to couple with a flash device 134 to provide firmware 154 for the management controller 102. In one example, the management controller 102 and the flash device 134 are coupled via a link 133 (such as a serial peripheral interface bus or other link or bus). In another example, the management controller 102 includes storage to store firmware on the same die or chip. Regardless of how firmware is stored or provided to the management controller 102, in one example, the management controller includes circuitry to execute the firmware to perform various management tasks.

The management controller 102 includes I/O interface circuitry 150 to couple with components of the system 100, including the processors 108A, 108B, the memory controllers 110A, 110B, memory 104, 106, and the fan controller 122. Note that although the I/O interface circuitry 150 is illustrated as a single block, the I/O interface circuitry 150 represents multiple hardware interfaces for coupling with various signal lines, buses, links, and/or fabrics. For example, the management controller 102 is coupled with the memory modules 166 via one or more signal lines 118. For example, referring to FIG. 1A, the management controller 102 is coupled with the memory 106 via a link or bus 118A, and the management controller 102 is coupled with the memory 104 via the link or bus 118B. The management controller 102 is coupled with one or more processors (e.g., the processors 108A, 108B of FIG. 1A) and/or one or more memory controllers (e.g., the memory controllers 110A, 110B) via one or more signal lines 116. In the example illustrated in FIG. 1A, in addition to a direct connection (e.g., via signal lines 116) to the processors 108A, 108B, the management controller 102 is also coupled with the processors 108A, 108B via the chipset 120, as mentioned above. In the example illustrated in FIG. 1F, the interface circuitry 150 is to couple with the fan controller 122 via one or more signal lines 124. In one such example, the signal lines 124 transmit one or more of tachometer (tach) signals, pulse width modulation (PWM) signals, and other fan control signals.

The I/O interface circuitry can also include interfaces to other buses, signal lines, links, and/or fabrics 165. For example, the interface circuitry 150 of the management controller 102 can couple with one or more of: a Management Component Transport Protocol (MCTP) interface, a PCIe link, a Universal Serial Bus (USB) (such as USB 2.0), an I2C bus, an I3C bus, a serial peripheral interface (SPI), an embedded SPI (eSPI), GPIO pins and signal lines, SMBus, PECi, an ethernet interface, or other signal lines, bus, link, or fabric.

The management controller 102 includes logic 156 to enable the management controller 102 to implement predictive failure analysis (PFA) techniques. Note that the logic 156 can include processing logic capable of executing instructions (e.g., of the firmware 154), circuitry to implement specific functions, or a combination thereof. The logic 156 of the management controller 102 monitors the rate of corrected errors in memory 104, 106 (e.g., with the logic 158), monitors the temperature of the memory 104, 106 and other components in the system 100 (e.g., with the logic 160), and controls the fans 114A-114D in the system 100 (e.g., with the logic 162).

According to examples described herein, the logic 156 boosts the fan speed to one or more memory modules based on the corrected error count being lower than the first threshold to trigger the replacement of memory resources, but when the rate of corrected errors is greater than a second threshold, and further based on detecting that fluctuations in the temperature of the one or more memory modules are greater than a third threshold. By boosting the fans in response to both fluctuations in temperature and in response to the rate of corrected errors before memory resources are replaced (such as with sparing, SDDC, or ADDDC), uncorrectable errors can be prevented without unnecessarily using the system's redundant memory resources.

Figure 2A:
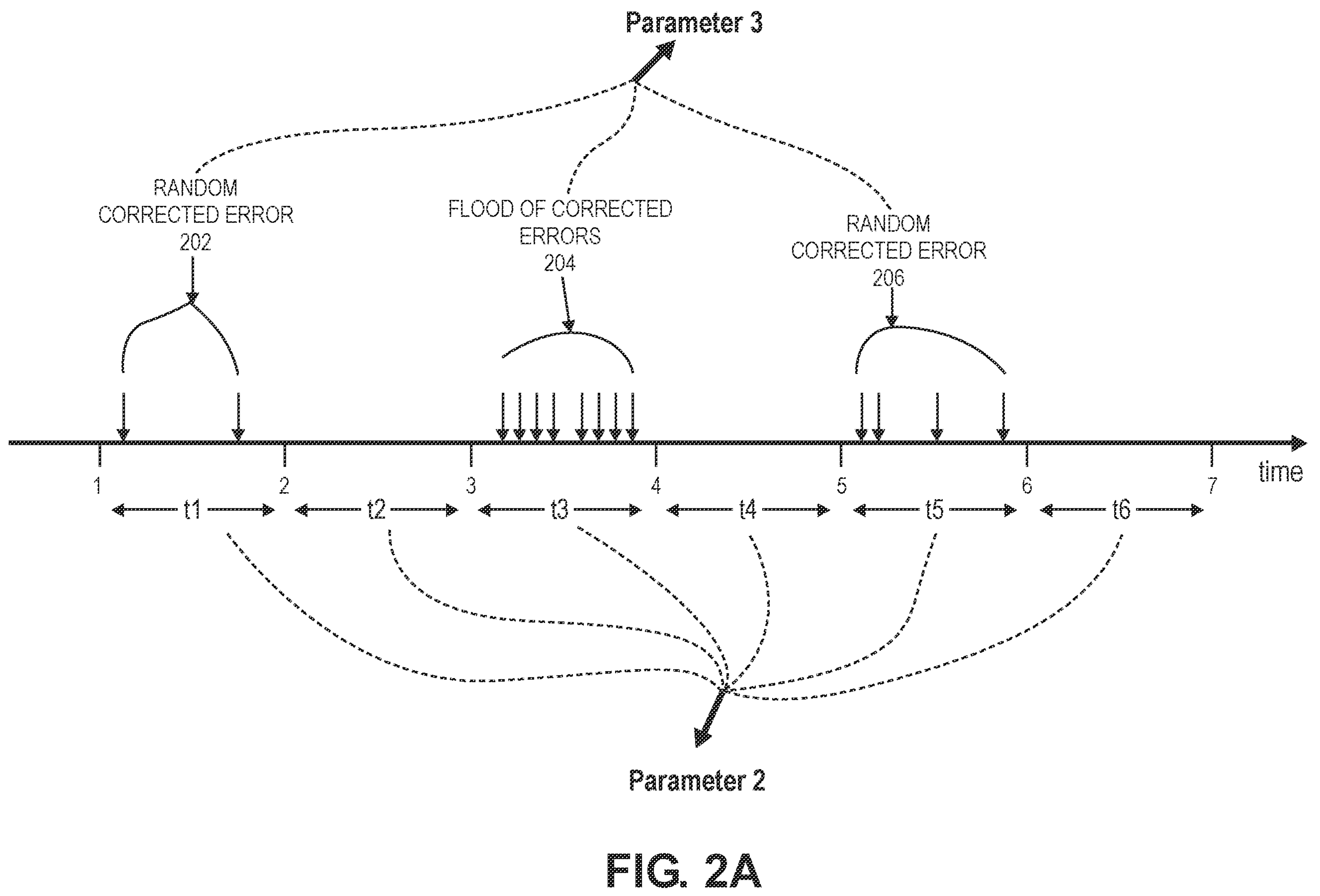
FIG. 2A is a diagram illustrating an example of error count over time.
Figure 2B:
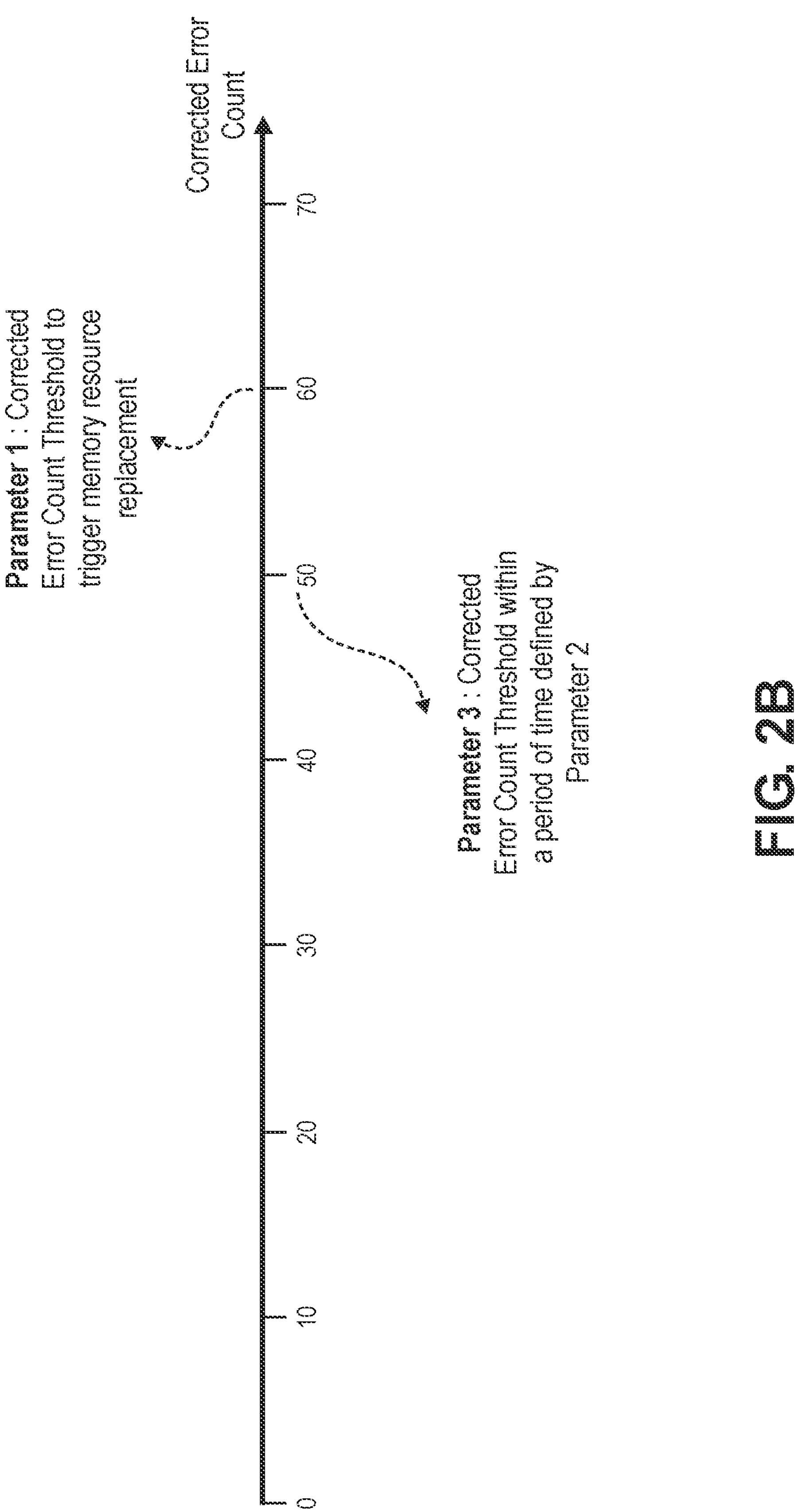
FIG. 2B is a diagram illustrating an example of error count thresholds.

In one such example, the management controller 102 is configured to detect a burst or flood of correctable errors within certain time frame. The time duration and the number of corrected errors within the time duration that result in triggering a response are configurable parameters. For example, the management controller 102 includes parameters 195. The parameters 195 can be controlled or configured via hardware (e.g., by programming registers, or with other circuitry for enabling configurability of parameters), firmware, software, or a combination thereof. The parameters 195 include a corrected error count threshold 189 (referred to herein as Parameter 1), a time duration parameter 191 (referred to herein as Parameter 2), another corrected error count rate threshold 192 (referred to herein as Parameter 3), and a thermal threshold 193. The management controller 102 may also include other configurable parameters 194. FIGS. 2A and 2B illustrate examples of corrected error count thresholds and the time duration parameter.

FIG. 2A is a diagram illustrating an example of the rate of corrected errors (e.g., number of corrected errors detected during a window or period of time). FIG. 2B is a diagram illustrating an example of error count thresholds.

Turning first to FIG. 2A, the illustrated example shows how corrected errors 202, 204, 206 can occur in a platform. The corrected errors 202, 204, and 206 represent errors encountered in or from one or more memory modules that were corrected. The corrected memory errors that are counted can be corrected with on-die ECC (e.g., ECC logic 177 of FIG. 1D, with ECC logic of the memory controller (e.g., ECC logic 179 of FIG. 1B), or a combination. Time is shown in periods of time, t1-t6. In one example, the duration of time in each of the periods of time t1-t6 is based on a configurable parameter (referred to as Parameter 2). Parameter 2 is the time duration limit within corrected errors is detected to determine the rate of corrected errors. Parameter 2 is an example of the time duration parameter 191 of FIG. 1F. Referring again to FIG. 2A, parameter 3 is a corrected error count threshold within certain time frame defined by Parameter 2. Parameter 3 is an example of the corrected error count threshold 192 of FIG. 1F.

In one example, to determine the corrected error rate, the management controller 102 counts the number of corrected errors in each of the time periods t1-t6. For example, in the time duration t1, two corrected errors have occurred (e.g., random corrected errors 202). In the time duration t2, there are no corrected errors. In the time duration t3, eight corrected errors are detected (e.g., the flood of corrected errors 204). In the time duration t5, there are four corrected error (e.g., random corrected errors 206). Consider an example in which the time axis represents seconds, the corrected error count threshold (e.g., Parameter 3) is '5', and the duration of time (e.g., Parameter 2) is '1'. In this example, the rate of corrected errors exceeds the threshold (e.g., the threshold based on Parameters 2 and 3) during time t3 because 8 errors occurred within the time period of 1 second. In this example, consider that if the corrected error threshold (e.g., Parameter 1) is a higher number, such as 50, then the corrected error count is lower than the threshold by 7 seconds, because 14 corrected errors have occurred, which is lower than 50.

In one example, the management controller 102 tracks the corrected error rate for each memory module in the system independently. For example, referring to FIG. 1A, the management controller 102 can track the corrected error rate for each of DIMM0-DIMM N−1 of memory thermal zone 112A and DIMM0-DIMM M−1 of memory thermal zone 112B. In another example, the management controller 102 tracks the corrected error rate across multiple memory modules in a thermal zone. For example, the management controller 102 tracks the corrected error rate from any of DIMM0-DIMM M−1 in memory thermal zone 112C.

FIG. 2B illustrates an example of two different error count thresholds. The corrected error count threshold defined by Parameter 1 is greater than (e.g., a larger number than) the corrected error count rate threshold defined by Parameter 3. The corrected error count rate threshold defined by Parameter 3 can also be referred to as an error count water mark. In one example, the corrected error count threshold defined by Parameter 1 is the threshold at which the replacement of memory resources (e.g., rank sparing or replacement of one or more devices with redundant devices) is triggered. For example, when the management controller 102 detects that the corrected error count is greater than a corrected error threshold defined by Parameter 1, the management controller 102 triggers memory resource replacement, such as sparing, SDDC, ADDDC, or other technique for replacing a memory resource with a redundant memory resource.

In contrast, in one example, the corrected error rate (based on Parameters 2 and 3) is used in combination with the thermal status of memory modules to determine when to boost the fans. For example, when the management controller 102 detects that the error count is lower than the corrected error count threshold (Parameter 1), but greater than the corrected error count rate threshold (Parameter 3) within a predetermined time period (Parameter 2), the management controller 102 will monitor the temperature fluctuations of the memory modules and boost the fans if excessive temperature fluctuations are detected. Note that although FIG. 2B shows an example of specific values for Parameters 1 and 3, these values are intended to be exemplary and non-limiting.

Figure 3:
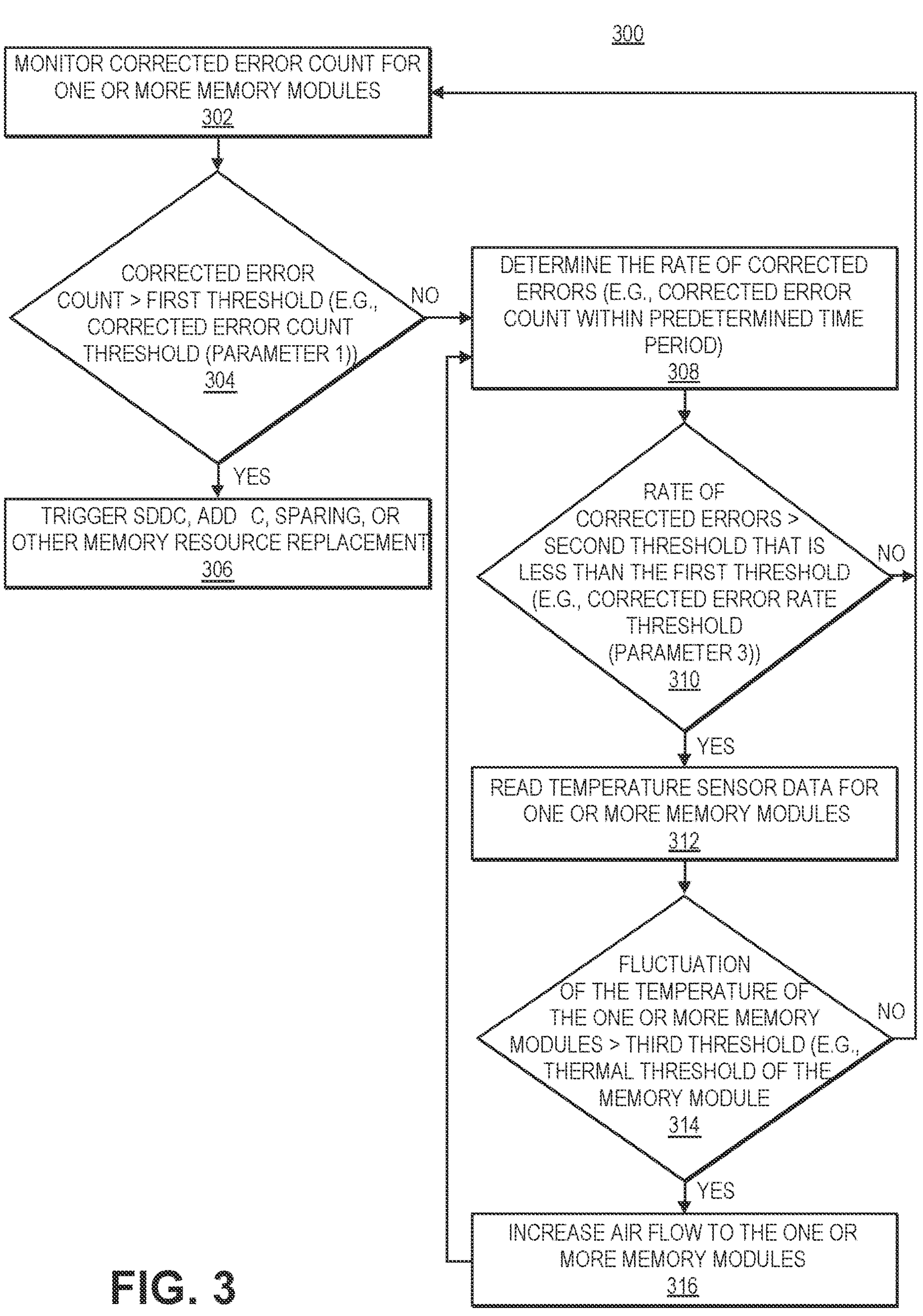
FIG. 3 is a flow chart of an exemplary method of thermal aware predictive failure analysis.

FIG. 3 is a flow chart of an exemplary method 300 of thermal aware predictive failure analysis. The method 300 can be performed by hardware, firmware, or a combination of hardware and firmware. In one example, the method 300 is performed by a management controller, such as the management controller 102 of FIGS. 1A and 1F.

The method 300 begins with monitoring the corrected error count for one or more memory modules, at block 302. For example, referring to FIGS. 1A and 1F, the corrected error monitoring logic 158 receives corrected error count data for the memory modules of memory 104, 106 from the memory controllers 110A, 110B (e.g., via I/O interface circuitry 150 of the management controller 102). In one example, the corrected error monitoring logic 158 monitors a pin (e.g., an Alert pin, an event pin, a GPIO pin, and/or another pin) for a logic value to be asserted that indicates a corrected error has occurred. In one such example, when the corrected error monitoring logic 158 detects that an error has occurred, the corrected error monitoring logic 158 can read a register of the memory controller (e.g., a register 158 of FIG. 1B) to determine the corrected error count, location of the corrected error (e.g., which memory device, memory module, rank, or other granularity), and/or other corrected error information.

The corrected error monitoring logic 158 counts or tracks the number of corrected errors encountered in the one or more memory modules. In one example, the corrected error count refers to the total corrected error count for a memory resource being monitored. Error counts can be tracked at varying levels of granularity; for example, the corrected error count can be tracked for a rank, a memory device, a memory module, and/or for other granularities of memory resources. The corrected error monitoring logic 158 can then compare the number of corrected errors with a first threshold (e.g., the corrected error count threshold 189 of FIG. 1F). In one example, the first threshold represents an error count threshold at which the replacement of memory resources with redundant memory resources is triggered.

Referring again to FIG. 3, if the corrected error count is greater than the first threshold, block 304 YES branch, then the management controller 102 triggers SDDC, ADDDC, sparing, or other memory resource replacement, at block 306. If the corrected error count has not exceeded the first threshold, block 304 NO branch, then the management controller 102 determines the rate of corrected errors, at block 308. In one example, the rate of corrected errors is the corrected error count within a predetermined time period. For example, the rate of corrected errors is the number of errors within the period of time specified by the time duration parameter 191 of FIG. 1F. The corrected error monitoring logic 158 can then compare the rate of corrected errors with a second threshold (e.g., based on the corrected error count threshold 189 and the time duration 191 of FIG. 1F). The corrected error monitoring logic 158 is to determine that the rate of the corrected errors is greater than the second threshold when a number of corrected errors within a predetermined time period (e.g., Parameter 2) is greater than a predetermined value (e.g., Parameter 3) that is lower than the first threshold (e.g., Parameter 1).

Referring again to FIG. 3, if the rate of corrected errors is not greater than a second threshold, block 310 NO branch, the management controller 102 continues to monitor the corrected error count for one or more memory modules, at block 302. If the rate of corrected errors is greater than a second threshold, block 310 YES branch, the management controller 102 reads temperature sensor data for one or more memory modules, at block 312. For example, referring to FIGS. 1D and 1F, the temperature monitoring logic 160 of the management controller 102 reads the thermal sensor 168 of the memory module 166.

In one example, the temperature monitoring logic 160 of the management controller 102 reads the thermal sensor 168 multiple times over a predetermined period of time at a predetermined frequency to determine how much the temperature of the memory module 166 is fluctuating. In one example, the management controller 102 can read the temperature sensor on a memory module via a direct link (e.g., a direct out-of-band link such as the links 118A, 118B of FIG. 1A) between the management controller 102 and the memory module. The temperature monitoring logic 160 can then compare the detected fluctuation in temperature with a third threshold (e.g., the thermal threshold 193 of FIG. 1F).

Referring again to FIG. 3, if the fluctuation of the temperature of the one or more memory modules is not greater than the third threshold, block 314 NO branch, the management controller 102 continues to monitor the corrected error count, at block 302. If the fluctuation of the temperature of the one or more memory modules is greater than the third threshold, block 314 YES branch, the management controller 102 increases air flow to the one or more memory modules, at block 316. In one example, the temperature monitoring logic 160 determines whether the fluctuation of the temperature is greater than the third threshold when a difference between a minimum temperature and a maximum temperature in a predetermined period of time exceeds the third threshold. In another example, temperature monitoring logic 160 determines whether the fluctuation of the temperature is greater than the third threshold when a difference between the minimum or maximum temperature in the predetermined period of time and an average temperature exceeds the third threshold.

Regardless of the exact algorithm or parameters used to determine that temperature fluctuations detected at the memory modules is excessive, in one example, the management controller 102 increases the air flow to the one or more memory modules with the temperature fluctuations and high corrected error rate, at block 316. In one example, increasing the air flow to the one or more memory modules involves increasing the speed of (e.g., boosting) one or more fans in a thermal zone including the one or more memory modules. For example, referring to FIGS. 1A and 1F, the fan control logic 162 of the management controller 102 can increase the speed to the fan 114A in the memory thermal zone 112A or the fan 114C in the memory thermal zone 112C. In one example, the fan control logic 162 sends one or more signals to the fan controller 122 to increase the speed of fans in the desired thermal zone. In one example, the decision to boost the fans is also based on the current fan speeds. For example, the fans may already be operating at maximum speed, or at a speed that is deemed optimum. Thus, in one example, the fan control logic is to increase the air flow further in response to a determination that the air flow to the one or more memory modules is below a fourth threshold.

Thus, in one example, the management controller 102 includes logic to increase the air flow to one or more memory modules in response to a determination that the corrected error count is lower than a first threshold, the rate of corrected errors is greater than a second threshold, and a fluctuation of a temperature of the one or more memory modules is greater than a third threshold. The corrected error monitoring logic 158 of the management controller 102 can then continue monitoring the rate of corrected errors after increasing the air flow, at block 308. If the corrected error rate falls below the second threshold, the management controller 102 can reduce air flow (e.g., reduce air flow to previous levels), and continue monitoring corrected error count for the one or more memory modules, at block 302.

As mentioned above, some examples refer to triggers that are based on a value being greater than or less than a threshold. Those having skill in the art will understand that whether a trigger occurs when a value, number, or threshold is "greater than" versus "greater than or equal to" is a design choice and does not affect the scope of the invention. Similarly, whether a trigger occurs when a value, number, or threshold is "lower than" versus "lower than or equal to" is a design choice and does not affect the scope of the invention.

Figure 4:
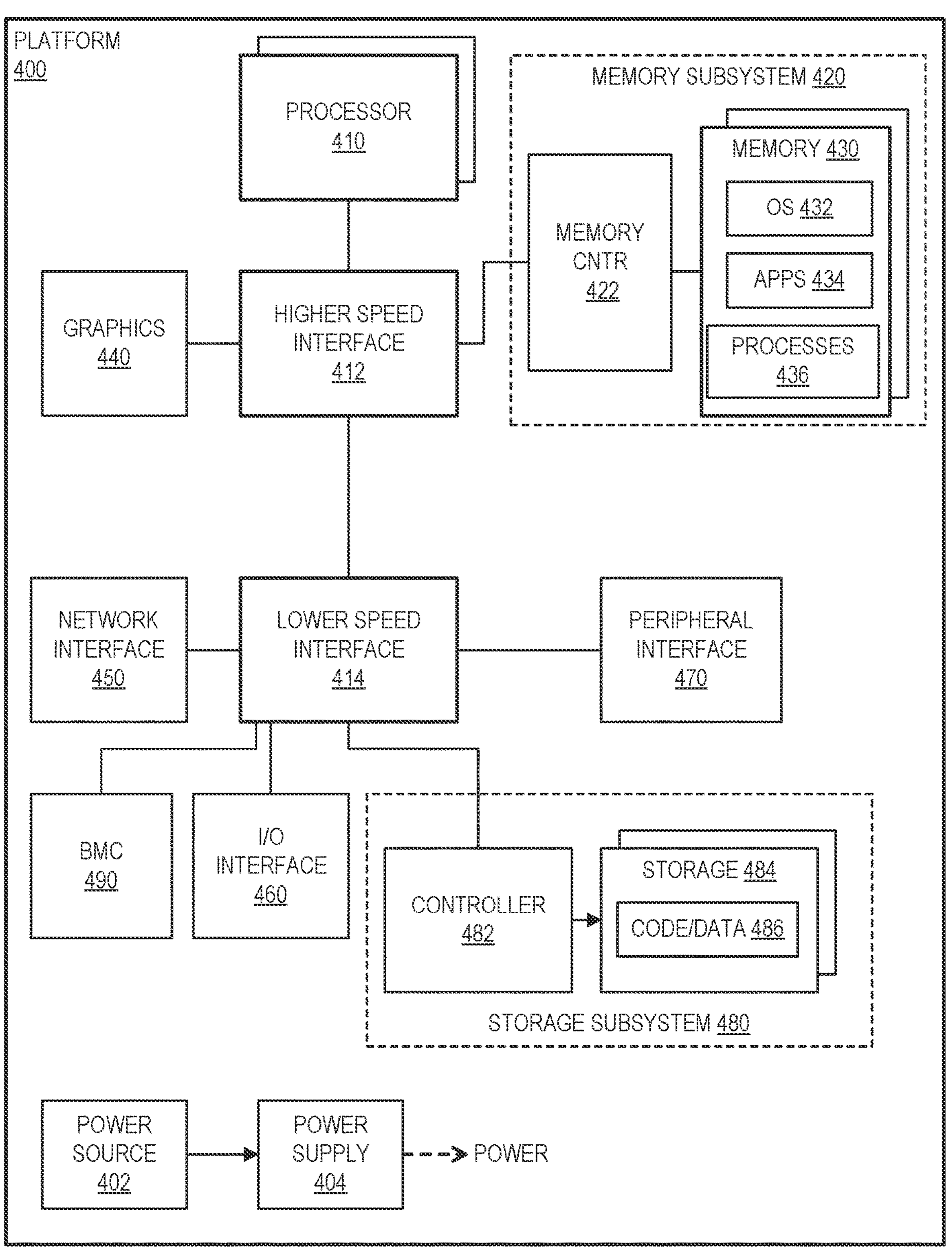
FIG. 4 illustrates a block diagram of an exemplary compute platform in which embodiments described and illustrated herein may be implemented.

FIG. 4 illustrates a block diagram of an exemplary compute platform in which embodiments described and illustrated herein may be implemented. Compute platform 400 represents a computing device or computing system in accordance with any example described herein, and can be a server, laptop computer, desktop computer, or the like. The compute platform 400 can be, or include, the system 100 of FIG. 1A.

Compute platform 400 includes a processor 410, which provides processing, operation management, and execution of instructions for compute platform 400. Processor 410 can include any type of microprocessor, CPU, graphics processing unit (GPU), infrastructure processing unit (IPU), processing core, or other processing hardware to provide processing for compute platform 400, or a combination of processors. Processor 410 may also comprise an SoC or XPU. Processor 410 controls the overall operation of compute platform 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 400 includes interface 412 coupled to processor 410, which can represent a higher speed interface or a high throughput interface for system components that needs higher bandwidth connections, such as memory subsystem 420 or graphics interface components 440. Interface 412 represents an interface circuit, which can be a standalone component or integrated onto a processor die. Where present, graphics interface 440 interfaces to graphics components for providing a visual display to a user of compute platform 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both.

Memory subsystem 420 represents the main memory of compute platform 400 and provides storage for code to be executed by processor 410, or data values to be used in executing a routine. Memory 430 of memory subsystem 420 may include one or more memory devices such as DRAM devices, read-only memory (ROM), flash memory, or other memory devices, or a combination of such devices. Memory 430 stores and hosts, among other things, operating system (OS) 432 to provide a software platform for execution of instructions in compute platform 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for compute platform 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410. The memory 430 and memory controller 422 can be in accordance with standards such as: DDR4 (Double Data Rate version 4, initial specification published in September 2012 by JEDEC (Joint Electronic Device Engineering Council)), DDR4E (DDR version 4), LPDDR3 (Low Power DDR version 3, JESD209-3B, August 2013 by JEDEC), LPDDR4 (LPDDR version 4, JESD209-4, originally published by JEDEC in August 2014), WI02 (Wide Input/Output version 2, JESD229-2 originally published by JEDEC in August 2014), HBM (High Bandwidth Memory, JESD325, originally published by JEDEC in October 2013), DDR5 (DDR version 5, JESD79-5A, published October, 2021), DDR version 6 (DDR6) (currently under draft development), LPDDR5, HBM2E, HBM3, and HBM-PIM, or others or combinations of memory technologies, and technologies based on derivatives or extensions of such specifications. The specification for LPDDR6 is currently under development. The JEDEC standards are available at www.jedec.org.

While not specifically illustrated, it will be understood that compute platform 400 can include one or more links, fabrics, buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses or other interconnections can include, for example, one or more of a system bus, a Peripheral Component Interconnect (PCI) bus, a HyperTransport or industry standard architecture (ISA) bus, a small computer system interface (SCSI) bus, a universal serial bus (USB), PCIe link, or an Institute of Electrical and Electronics Engineers (IEEE) standard 1394 bus.

In one example, compute platform 400 includes interface 414, which can be coupled to interface 412. Interface 414 can be a lower speed interface than interface 412. In one example, interface 414 represents an interface circuit, which can include standalone components and integrated circuitry. In one example, multiple user interface components or peripheral components, or both, couple to interface 414. Network interface 450 provides compute platform 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can exchange data with a remote device, which can include sending data stored in memory or receiving data to be stored in memory.

In one example, compute platform 400 includes one or more I/O interface(s) 460. I/O interface(s) 460 can include one or more interface components through which a user interacts with compute platform 400 (e.g., audio, alphanumeric, tactile/touch, or other interfacing). Peripheral interface 470 can include any hardware interface not specifically mentioned above. Peripherals refer generally to devices that connect dependently to compute platform 400. A dependent connection is one where compute platform 400 provides the software platform or hardware platform or both on which operation executes, and with which a user interacts.

In one example, compute platform 400 includes storage subsystem 480 to store data in a nonvolatile manner. In one example, in certain system implementations, at least certain components of storage subsystem 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage device(s) 484 holds code or instructions and data 486 in a persistent state (i.e., the value is retained despite interruption of power to compute platform 400). A portion of the code or instructions may comprise platform firmware that is executed on processor 410. Storage device(s) 484 can be generically considered to be a "memory," although memory 430 is typically the executing or operating memory to provide instructions to processor 410. Whereas storage device(s) 484 is nonvolatile, memory 430 can include volatile memory (i.e., the value or state of the data is indeterminate if power is interrupted to compute platform 400). In one example, storage subsystem 480 includes controller 482 to interface with storage device(s) 484. In one example controller 482 is a physical part of interface 414 or processor 410 or can include circuits or logic in both processor 410 and interface 414.

Compute platform 400 includes Baseboard Management Controller (BMC) 490 that is configured to effect the operations and logic corresponding to the flowcharts disclosed herein. BMC 490 may include a microcontroller or other type of processing element such as a processor core, engine or micro-engine, that is used to execute instructions to effect functionality performed by the BMC. Optionally, another management component (standalone or comprising embedded logic that is part of another component) may be used. The BMC 490 is an example of the management controller 102 of FIGS. 1A and 1F.

Power source 402 provides power to the components of compute platform 400. More specifically, power source 402 typically interfaces to one or multiple power supplies 404 in compute platform 400 to provide power to the components of compute platform 400. In one example, power supply 404 includes an AC to DC (alternating current to direct current) adapter to plug into a wall outlet. Such AC power can be renewable energy (e.g., solar power) power source 402. In one example, power source 402 includes a DC power source, such as an external AC to DC converter. In one example, power source 402 can include an internal battery or fuel cell source.

Examples of thermal aware predictive failure analysis follow.

Example 1: A device including: an interface to couple with one or more memory modules, and logic to increase air flow to the one or more memory modules in response to a determination that: a corrected error count for the one or more memory modules is lower than a first threshold at which memory resource replacement is triggered, a rate of corrected errors for the one or more memory modules is greater than a second threshold, and a fluctuation of a temperature of the one or more memory modules is greater than a third threshold.

Example 2: The device of example 1, wherein: the logic is to trigger replacement of memory resources with redundant memory resources in response to a determination that the corrected error count is greater than the first threshold.

Example 3: The device of any of examples 1 or 2, wherein: the replacement of memory resources includes: rank sparing or replacement of one or more devices with redundant devices.

Example 4: The device of any of examples 1-3, wherein: the logic is to determine that the rate of the corrected errors is greater than the second threshold when a number of corrected errors within a predetermined time period is greater than a predetermined value that is lower than the first threshold.

Example 5: The device of any of examples 1-4, wherein: the logic to increase the air flow to the one or more memory modules is to: increase a speed of a fan in a thermal zone including the one or more memory modules.

Example 6: The device of examples 1-5, wherein: the logic is to: continue monitoring the rate of corrected errors after the increase in air flow, and reduce air flow to the one or more memory modules in response to a determination that the rate of corrected errors is below the second threshold.

Example 7: The device of any of examples 1-6, wherein: the logic is to: read a temperature sensor of the one or more memory modules multiple times within a period of time to determine whether the fluctuation of the temperature is greater than the third threshold.

Example 8: The device of example 7, wherein: the logic is to determine the fluctuation of the temperature is greater than the third threshold when a difference between a minimum temperature and a maximum temperature in the period of time exceeds the third threshold or when a difference between the minimum or maximum temperature in the period of time and an average temperature exceeds the third threshold.

Example 9: the device of example 7, wherein: the logic is to read the temperature sensor of the one or more memory modules via a direct link between the device and the one or more memory modules.

Example 10: The device of any of examples 1-9, wherein: the logic is to increase air flow to the one or more memory modules further in response to a determination that the air flow to the one or more memory modules is below a fourth threshold.

Example 11: The device of any of examples 1-10, wherein the device is a management controller (e.g., BMC).

Example 12. A system including: a memory controller to couple with one or more memory modules, and management control logic coupled with the memory controller, the management control logic to: increase air flow to the one or more memory modules in response to a determination that: a corrected error count for the one or more memory modules is lower than a first threshold, a rate of corrected errors for the one or more memory modules is greater than a second threshold, and a fluctuation of a temperature of the one or more memory modules is greater than a third threshold.

Example 13: The system of example 12, wherein: the memory controller in included in a processor.

Example 14: The system of any of examples 12 or 13, further including one or more of: the one or more memory modules and one or more fans in a thermal zone that includes the one or more memory modules.

Example 15: The system of any of examples 12-14, wherein: the management control logic is in accordance with the device of any of examples 1-11.

Example 16: A method including: monitoring a rate of corrected errors for one or more memory modules, and increasing air flow to the one or more memory modules in response to a determination that: a corrected error count for the one or more memory modules is lower than a first threshold, a rate of corrected errors for the one or more memory modules is greater than a second threshold, and a fluctuation of a temperature of the one or more memory modules is greater than a third threshold.

Example 17: The method of example 16, wherein: replacement of memory resources with redundant memory resources in triggered in response to a determination that the corrected error count is greater than the first threshold, and the rate of the corrected errors is greater than the second threshold when a number of corrected errors within a predetermined time period is greater than a predetermined value that is lower than the first threshold.

Example 18: the method of examples 16 or 17, wherein: increasing the air flow to the one or more memory modules includes increasing a speed of a fan in a thermal zone including the one or more memory modules.

Example 19: the method of any of examples 16-18, further including: continuing to monitor the rate of corrected errors after the increase in air flow, and reducing the air flow to the one or more memory modules in response to a determination that the rate of corrected errors is below the second threshold.

Example 20: A non-transitory machine-readable medium having instructions stored thereon configured to be executed on one or more processors to perform a method in accordance with any of examples 16-19.

As discussed above, in some embodiment the processors illustrated herein may comprise Other Processing Units (collectively termed XPUs). Examples of XPUs include one or more of Graphic Processor Units (GPUs) or General Purpose GPUs (GP-GPUs), Tensor Processing Units (TPUs), Data Processing Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

While various embodiments described herein use the term System-on-a-Chip or System-on-Chip ("SoC") to describe a device or system having a processor and associated circuitry (e.g., Input/Output ("I/O") circuitry, power delivery circuitry, memory circuitry, etc.) integrated monolithically into a single Integrated Circuit ("IC") die, or chip, the present disclosure is not limited in that respect. For example, in various embodiments of the present disclosure, a device or system can have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems the various dies, tiles and/or chiplets can be physically and electrically coupled together by a package structure including, for example, various packaging substrates, interposers, active interposers, photonic interposers, interconnect bridges and the like. The disaggregated collection of discrete dies, tiles, and/or chiplets can also be part of a System-on-Package ("SoP").

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Note that actions triggered in response to a value being greater than or lower than a threshold can mean greater than or equal to, or lower than or equal to, and are design choices. Thus, it is understood that the terms "greater than" or "lower than" a threshold are intended to encompass embodiments in which a trigger occurs in response to the value being "greater than or equal to" or "lower than or equal to."

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A management controller comprising:
- an interface to separately couple with a memory controller and with a memory module, the memory module located in a thermal zone; and
- logic to increase air flow to the thermal zone in response to a determination that:
  - a corrected error count for the memory module is lower than a first threshold at which memory resource replacement is triggered,
  - a rate of corrected errors for the memory module is greater than a second threshold, and
  - a fluctuation of a temperature of the memory module is greater than a third threshold.

2. The management controller of claim 1, wherein:
- the logic is to trigger replacement of memory resources with redundant memory resources in response to a determination that the corrected error count is greater than the first threshold.

3. The management controller of claim 2, wherein: the replacement of the memory resources includes: rank sparing or the replacement of the memory resources with the redundant memory resources.

4. The management controller of claim 1, wherein: the logic is to determine that the rate of the corrected errors is greater than the second threshold when a number of corrected errors within a predetermined time period is greater than a predetermined value that is lower than the first threshold.

5. The management controller of claim 1, wherein: the logic to increase the air flow to the thermal zone is to: increase a speed of a fan directing air flow to the thermal zone.

6. The management controller of claim 1, wherein: the logic is to:
continue monitoring the rate of corrected errors after the increase in air flow, and
reduce air flow to the thermal zone in response to a determination that the rate of corrected errors is below the second threshold.

7. The management controller of claim 1, wherein: the logic is to:
read a temperature sensor of the memory module multiple times within a period of time to determine whether the fluctuation of the temperature is greater than the third threshold.

8. The management controller of claim 7, wherein: the logic is to determine the fluctuation of the temperature is greater than the third threshold when a difference between a minimum temperature and a maximum temperature in the period of time exceeds the third threshold or when a difference between the minimum or maximum temperature in the period of time and an average temperature exceeds the third threshold.

9. The management controller of claim 7, wherein: the logic is to read the temperature sensor of the memory module via a direct link between the management controller and the memory module.

10. The management controller of claim 1, wherein: the logic is to increase air flow to the thermal zone further in response to a determination that the air flow to the thermal zone is below a fourth threshold.

11. A system comprising:
a memory controller to couple with a memory modules, the memory module located in a thermal zone from among a plurality of thermal zones; and
management controller logic coupled with the memory controller and the memory module, the management control logic to:
increase air flow to the thermal zone in response to a determination that:
a corrected error count for the memory module is lower than a first threshold,
a rate of corrected errors for the memory module is greater than a second threshold, and
a fluctuation of a temperature of the memory module is greater than a third threshold.

12. The system of claim 11, wherein: the memory controller is included in a processor.

13. The system of claim 11, further comprising one or more of:
the memory module; and
one or more fans to cause the increase in air flow to the thermal zone.

14. The system of claim 11, wherein:
the management controller logic is to trigger replacement of memory resources with redundant memory resources in response to a determination that the corrected error count is greater than the first threshold; and
the management controller logic is to determine that the rate of the corrected errors is greater than the second threshold when a number of corrected errors within a predetermined time period is greater than a predetermined value that is lower than the first threshold.

15. The system of claim 11, wherein: the management controller logic comprises a baseboard management controller.

16. The system of claim 11, wherein: the management controller logic is to:
continue monitoring the rate of corrected errors after the increase in air flow, and
reduce air flow to the thermal zone in response to a determination that the rate of corrected errors is below the second threshold.

17. A non-transitory machine-readable medium having instructions stored thereon that when executed by a management controller separately coupled with a memory controller and a memory module cause the management controller to:
monitor a rate of corrected errors for the memory module; and
increase air flow to a thermal zone via which the memory modules are located, wherein the air flow is increased to the thermal zone in response to a determination that:
a corrected error count for the memory module is lower than a first threshold,
a rate of corrected errors for the memory module is greater than a second threshold, and
a fluctuation of a temperature of the memory module is greater than a third threshold.

18. The non-transitory machine-readable medium of claim 17, wherein:
replacement of memory resources with redundant memory resources is triggered in response to a determination that the corrected error count is greater than the first threshold; and
the rate of the corrected errors is greater than the second threshold when a number of corrected errors within a predetermined time period is greater than a predetermined value that is lower than the first threshold.

19. The non-transitory machine-readable medium of claim 17, wherein:
to increase the air flow to the thermal zone includes increasing a speed of a fan directing air flow to the thermal zone.

20. The non-transitory machine-readable medium of claim 17, wherein the instructions further cause the management controller to:
continue to monitor the rate of corrected errors after the increase in air flow; and
reduce the air flow to the thermal zone in response to a determination that the rate of corrected errors is below the second threshold.

* * * * *